United States Patent [19]

Bannell et al.

[11] Patent Number: 4,610,007
[45] Date of Patent: Sep. 2, 1986

[54] METHOD AND APPARATUS FOR SURVEYING POSITIONS OF MOORING LINES

[75] Inventors: John L. K. Bannell, Great Sutton; Donald M. Paul, Guildford, both of England

[73] Assignee: Shell Oil Company, Houston, Tex.

[21] Appl. No.: 568,161

[22] Filed: Jan. 4, 1984

[30] Foreign Application Priority Data

Jan. 5, 1983 [GB] United Kingdom ................ 8300176

[51] Int. Cl.$^4$ .............................................. G01S 15/42
[52] U.S. Cl. .................................................... 367/104
[58] Field of Search ................................ 367/104, 106

[56] References Cited

U.S. PATENT DOCUMENTS

| | | | |
|---|---|---|---|
| 2,418,846 | 4/1947 | Meacham | 367/104 |
| 3,400,363 | 9/1968 | Silverman | 340/3 |
| 3,744,013 | 7/1973 | Lapetina | 340/3 R |
| 3,781,775 | 12/1973 | Malloy et al. | 367/104 |
| 3,786,404 | 1/1974 | Ewing et al. | 367/2 |
| 3,810,081 | 5/1974 | Rininger | 367/106 |

FOREIGN PATENT DOCUMENTS 1587712  4/1981  United Kingdom .

OTHER PUBLICATIONS

Backus et al., *Deep Sea Research*, vol. 4, 1956, pp. 237–241.

*Primary Examiner*—Richard A. Farley

[57] ABSTRACT

Method and apparatus for surveying positions of mooring lines extending between a moored structure and anchors in the water bottom comprising a rotatable submarine transducer assembly including acoustic pulse transmitting means and an array of acoustic receivers, a support for locating the transducer assembly at a predetermined level above the water bottom and actuator means for rotating the assembly about a vertical axis relative to the support. During operation the transmitting means produces a beam of acoustic pulses. Pulse reflections originating from mooring line sections that are successively scanned by the beam are received by the acoustic receivers, and the position of each scanned mooring line section is calculated by a processor unit on the basis of the time interval at which the pulses are received after transmission.

13 Claims, 3 Drawing Figures

METHOD AND APPARATUS FOR SURVEYING POSITIONS OF MOORING LINES

BACKGROUND OF THE INVENTION

The invention relates to a method and apparatus for surveying positions of mooring lines extending between a moored structure and anchors in the bottom of a body of water.

The current use in deep water areas of permanently moored structures such as floating platforms carrying drilling or oil and gas production facilities has introduced safety problems associated with the positioning of mooring lines in relation to underwater facilities, such as well heads and flow lines on the water bottom. Detailed instructions for the deployment and operation of such moorings exist which permit satisfactory theoretical mooring patterns to be devised to minimize accidents due to anchor dragging and so forth. However, during the entire anchoring period measurements must still be carried out to check whether the touch points of the mooring lines onto the water bottom and the clearance between the mooring lines and the underwater installations meet the operating requirements. Such measurements, required under both long-term static conditions and during short-term movements of the vessel, are currently carried out by calculation of the mooring line catenary using measured values of the mooring line tension. The directions of the mooring lines in relation to the moored structure are measured when the structure is first positioned. It is thereby assumed that the submarine mooring lines take up a straight line between the structure and anchor. These techniques have been found to be inaccurate.

The primary object of the present invention is to provide a mooring line surveying method and means for continuously monitoring mooring line positions during extended periods of time without affecting the operations performed on the moored structure and, in particular, to provide a method and means for detecting the location of each of the touch points of the mooring lines onto the water bottom with an accuracy considerably superior to that of the techniques currently employed. A further object of the present invention is to provide a surveying method that is able to respond quickly to changes in mooring line positions, for instance, effects caused by oscillating movements of the moored structure due to wind, waves, tides and currents.

SUMMARY OF THE INVENTION

The method according to the present invention comprises the steps of: (a) arranging a transducer assembly including acoustic pulse transmitting means and an array of acoustic receivers at a predetermined submarine level above the water bottom by means of a support; (b) transmitting a beam of acoustic pulses by means of the transmitting means; (c) receiving pulse reflections by means of the array of acoustic receivers, the reflections originating from a mooring line section scanned by the beam; (d) transferring the received reflections to a processor unit and calculating the position of the scanned mooring line section on the basis of the time intervals at which the pulses are received after transmission; (e) rotating the transducer assembly relative to the support about a substantially vertical axis of rotation and repeating the sequence of steps (b) through (e).

The apparatus according to the present invention comprises: a transducer assembly for producing a beam of acoustic pulses, and an array of acoustic receivers; a support for locating the transducer assembly at a predetermined submarine level above a water bottom; actuator means for rotating the transducer assembly relative to the support about a vertical axis of rotation; and data transfer means for transferring data fro the transducer assembly to a processor unit.

In a suitable embodiment of the invention the processor unit is programmed to calculate the location of the touch point of each mooring line onto the water bottom and/or the position of each of the mooring lines at each point of the relevant mooring line catenary on the basis of the information gathered by the acoustic receiving means about the azimuth and elevation of a series of points along the length of each mooring line catenary.

The invention will now be explained in more detail by way of example with reference to the accompanying drawings.

DETAILED DESCRIPTION OF THE PREFERRED EMBODIMENTS

Figure 1:
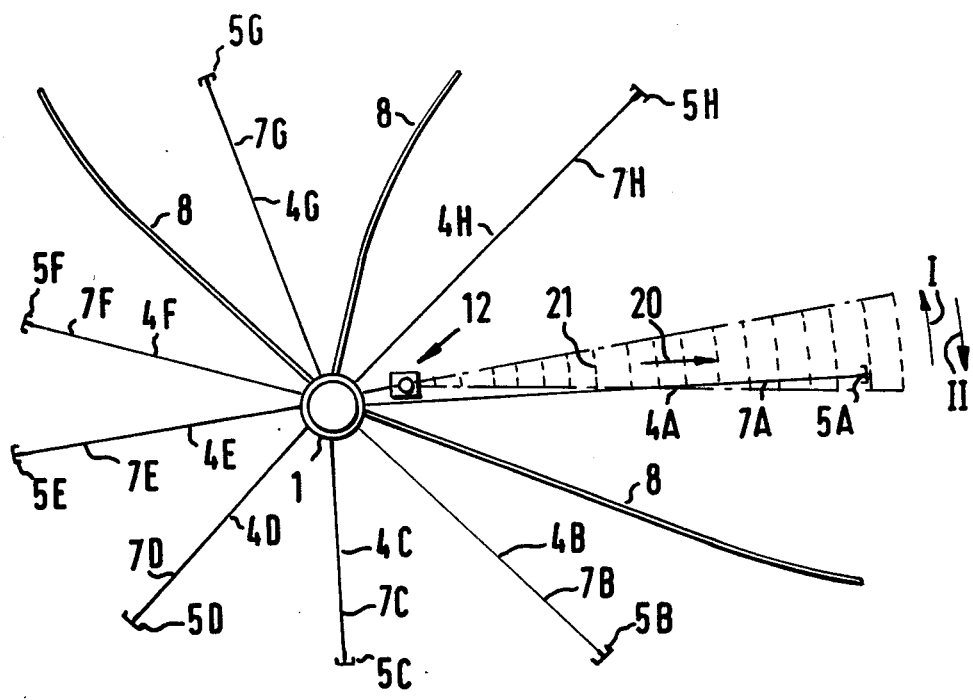
FIG. 1 shows a top view of a mooring system for an offshore structure together with mooring line surveying means according to the present invention.
Figure 2:
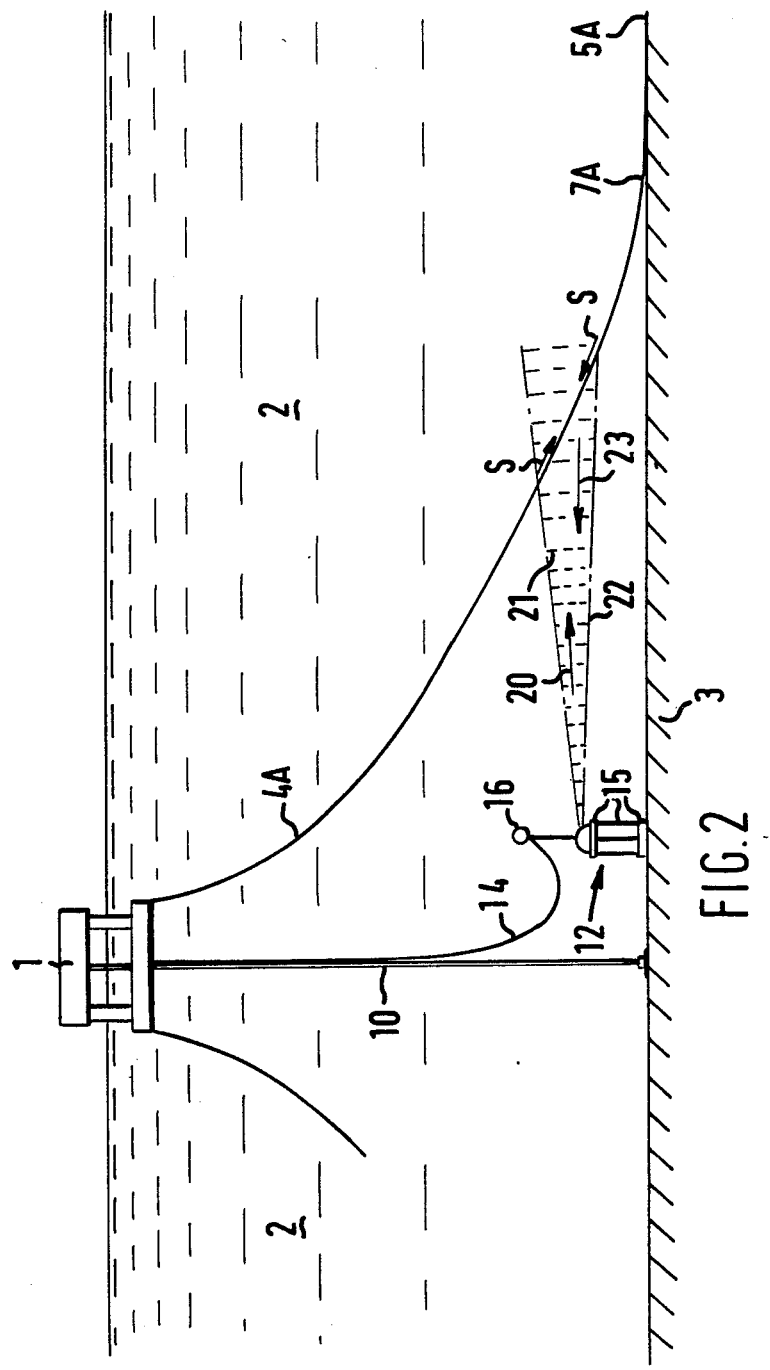
FIG. 2 shows the mooring system and the mooring line surveying means of FIG. 1 in elevation on an enlarged scale.

In FIGS. 1 and 2 a moored structure is indicated by the reference numeral 1. The structure 1 floats at the surface of a body of water 2 and is moored to the water bottom 3 by means of a mooring system 4 comprising eight mooring lines 4A through 4H that are connected to anchors 5A through 5H, respectively, which anchors are positioned in the water bottom 3. Structure 1 is a floating semi-submersible platform 1 carrying (not shown) facilities for the production of oil and/or gas. These production facilities are in communication with submarine oil and/or gas wells (not shown) via flow lines 8 that are arranged on the water bottom 3 and that communicate with a substantially vertical riser system 10 being suspended from the platform 1.

In order to detect the positions of the mooring lines 4A-H and especially the positions of the touch points 7A-H of these lines 4 onto the water bottom 3, a submarine mooring line surveying means 12 is placed on the water bottom 3 centrally with respect to the locations of the anchors 5A-5H. The mooring line surveying means 12 (see also FIG. 3) includes a transducer assembly 13 that is rotatably mounted on a support 15. Furthermore, a cable 14 including a plurality of data transfer and power supply leads provides communication between the transducer assembly 13 and a processor unit (not shown) on the platform 1. The support 15 includes a support member 15A (see FIG. 3) and a ballast member 15B which members are interconnected by four substantially parallel tension legs 15C. The tension legs 15C are kept in an upright position by positive buoyancy force acting on the support member 15A, which force is obtained by a buoyancy element 16 that is connected to the support member 15A by means of a tensioning cable 18.

Actuator means 17 are arranged in a watertight shell 19 on top of the support member 15 for rotating the transducer assembly 13 relative to the support 15 about a substantially vertical axis of rotation V. The actuator means 17 comprise an electric motor (not shown) for rotating the transducer assembly 13 in a reciprocating mode (see arrows I and II in FIG. 1) through a horizontal arc sector of about 360°.

The transducer assembly 13 consists of a transducer panel that comprises acoustic pulse transmitting means for generating a beam of acoustic pulses. The assembly 13 further comprises an array of horizontally and vertically separated acoustic receivers. Acoustic pulse transmitters as well as acoustic pulse receivers of the above type for submarine use are known per se and do not require a detailed description thereof.

Figure 3:
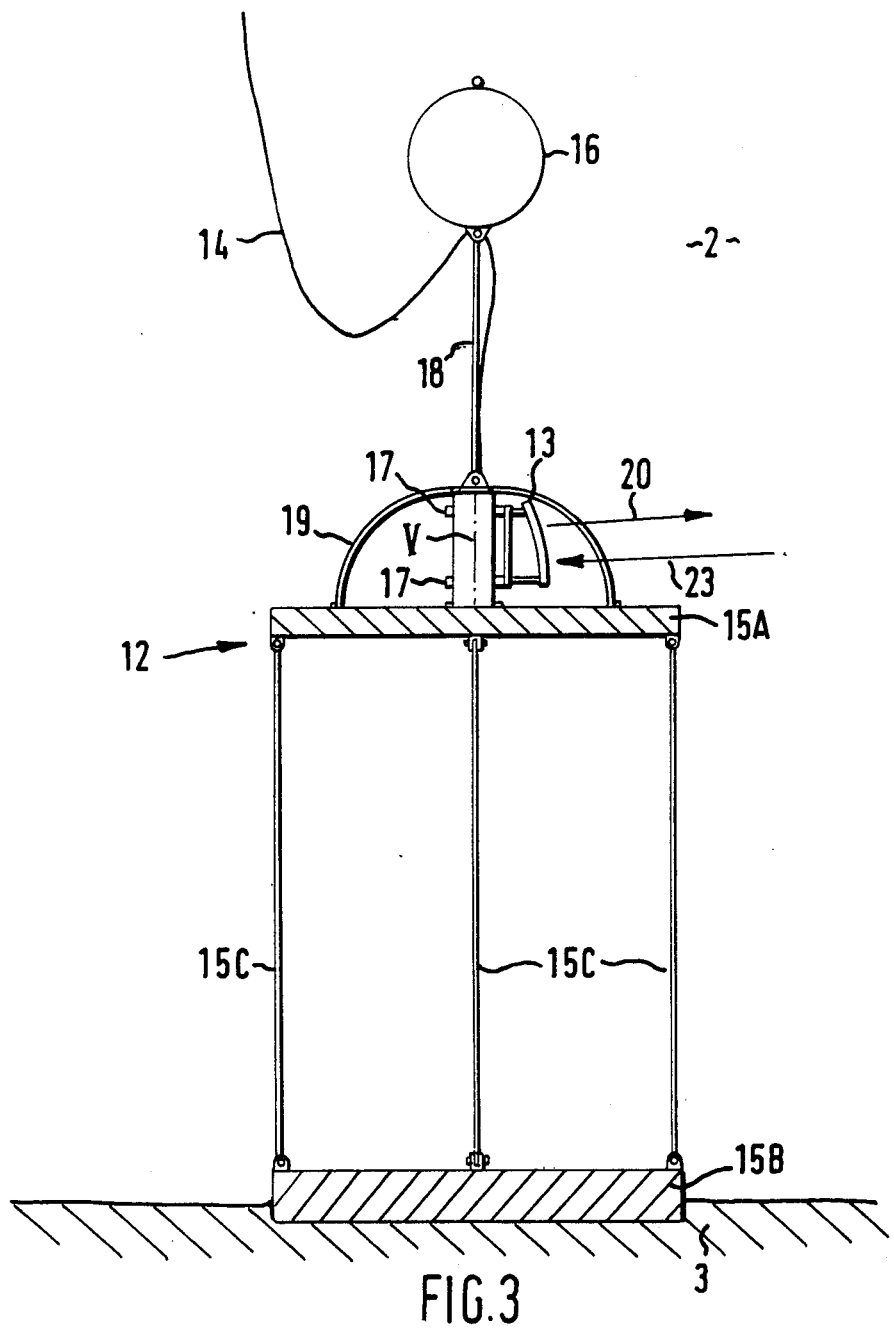
FIG. 3 shows in detail a vertical section of the mooring line surveying means of FIG. 1 and FIG. 2.

The operation of the mooring line surveying means 12 will now be explained with reference to FIGS. 1-3. During operation the acoustic pulse transmitters of the assembly 13 transmit a beam 20 of acoustic pulses 21, said beam 20 being of suitable geometry (such as a diffraction limited beam). The beam 20 is transmitted in such elevated direction that the lower boundary 22 of the beam 20 is approximately parallel to the water bottom 3 so as to restrict reverberations from the water bottom 3 to an acceptable value.

In the situation illustrated in FIGS. 1 and 2 the beam 20 of acoustic pulses 21 is directed towards section S of mooring line 4A, which section S is located close to the touch point 7A of said mooring line 4A onto the water bottom 3. The pulses 21 are transmitted at selected time intervals and each pulse 21 that hits the mooring line section S is subsequently reflected, so that a train of pulse reflections 23 originating from points along said section S travel back to the transducer assembly 13. The arrival times of the pulse reflections 23 at each of the receivers of the assembly 13 are detected and transferred via the cable 14 to the processor unit (not shown). The processor unit subsequently calculates the positions in the vertical plane of the points along section S by comparing the time intervals at which each of said pulses is received by the vertically separated receivers of the assembly 13 after transmission of the relevant pulse by the transmitting means. Simultaneously therewith the processor unit calculates the positions in the horizontal plane of the points along section S by comparing the time intervals at which each of said pulses is received by the horizontally separated receivers of the assembly 13 after transmission of the relevant pulse by the transmitting means.

The processor unit subsequently calculates the position and shape of the entire mooring line 4A on the basis of the calculated data on the position of the scanned section S by means of known mathematical formulas for catenaries.

Simultaneously with the acoustic pulse transmission and receiving process the assembly 13 is rotated relative to the support 15 about the vertical axis V in a reciprocating mode (see arrows I and II in FIG. 1) over an arc sector of about 360° so as to cover all eight of the mooring lines 4A-H during each scanning period. It will be understood that the position of each mooring line 4B-H may be calculated in the same manner as described hereinbefore with reference to mooring line 4A.

The calculated data on the positions of the mooring lines 4A-H are subsequently represented on a suitable display (not shown). Optionally the display includes a screen such that the positions of the mooring lines can effectively be seen by operating personnel. If desired, the positions of the touch points 7A-H of the mooring lines 4A-H onto the water bottom 3 can be represented separately on the display (not shown).

It will be understood that the present invention is not limited to the surveyance of the positions of mooring lines of permanently moored structures. In the example shown in the drawings, the acoustic surveying means 12 can be used for the surveyance of mooring lines of those supply vessels (not shown) that are temporarily anchored near the floating production platform 1. Furthermore other submerged objects will be detected by the acoustic surveying means 12, such as the marine riser 10 and those parts of submarine production facilities (not shown) that are within the scope of the beam 20 of acoustic signals 21. The reflections obtained by these objects of known location can be used to measure the position of the transducer assembly 13 itself.

The invention is not restricted to the use of a support that is located on the water bottom. If desired the support may be suspended from the moored structure. Moreover all other types of support structures suitable for the purpose, such as frameworks, towers, etc. may be applied.

The use of a single surveying system to monitor all mooring lines of the mooring system requires that the system is approximately centrally located with respect to the locations of the anchors so as to limit the distance between the mooring lines and the assembly to a minimum value. The invention, however, is not restricted to the use of a single surveying system. If desired a plurality of surveying systems may be positioned at different locations on the water bottom, wherein each system scans a sector of the mooring system.

The clearance between the mooring lines and submarine objects (such as pipelines and well heads) may be detected accurately by scanning the lower part of each mooring line. In order to position the transducer assembly such that it has uninterrupted "view" of the lower mooring line parts, the transducer assembly is to be located close to the water bottom. Depending on irregularities of the water bottom the distance between the transducer assembly and the water bottom will usually be between 5 and 25 meters.

Furthermore, the invention is not restricted to the use of a single transducer assembly in the acoustic surveying system. If desired two or more transducer assemblies may be mounted above each other, which assemblies transmit acoustic beams at different elevations so as to monitor simultaneously several sections of each mooring line in the manner as described hereinbefore with reference to the drawings. It will be appreciated that monitoring of several sections of each mooring line will improve the accuracy of the calculation of the positions of the mooring line catenaries.

The data that are continuously collected during the entire anchoring period by the surveying system according to the invention on the positions of the mooring line will enable operating personnel on the moored structure to adjust the mooring line pattern accurately in case the clearance between the mooring lines and the submarine facilities does not meet the operating requirements.

The mooring line surveying means according to the invention may be applied to monitor the shape of all kinds of mooring lines and tension legs, such as mooring chains, steel cables and mooring ropes. It will further be understood that the moored structure may be any type of offshore structure such as a floating platform, a guyed tower and a floating vessel.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. A method of surveying the positions of mooring lines extending between a moored structure and anchoring means at the bottom of a body of water, said method comprising the steps of: positioning on the bottom of said body of water a transducer assembly including an acoustic pulse transmitting means and an acoustic receiving means at a predetermined submarine level above the water bottom; transmitting acoustic pulses from the transmitting means; receiving pulses at the receiving means that have been reflected from a mooring line; determining the position including the ocean-floor touch points of the mooring line on the basis of the time intervals between the transmitting of the pulses and the receiving of the reflected pulses; rotating the transducer assembly about a substantially vertical axis of rotation and repeating said transmitting, receiving and determining steps to determine the position of each of said mooring lines.

2. A method as recited in claim 1, wherein said positioning step comprises positioning the transducer assembly on the water bottom.

3. A method as recited in claim 1, wherein said positioning step comprises suspending the transducer assembly from the moored structure.

4. A method as recited in claim 1, wherein the step of positioning the transducer assembly comprises positioning the transducer assembly approximately central with respect to the locations of the anchoring means.

5. A method as recited in claim 1, wherein said transmitting step comprises transmitting a beam of acoustic pulses at such elevation that the section of the mooring line that is scanned by the pulses is located near the touch point of that mooring line on the water botom.

6. A method as recited in claim 1, wherein said transmitting step comprises transmitting a beam of acoustic pulses at such an elevation that the lower boundary of the beam is substantially parallel to the water bottom.

7. A method as recited in claim 1, wherein said determining step comprises using the time intervals between the transmitting of the pulses and the receiving of the reflected pulses from the mooring lines to determine the azimuth and elevation of points along the scanned section of the mooring line.

8. An apparatus for surveying positions including the ocean-floor touch points of mooring lines extending between a moored structure and anchoring means at the bottom of a body of water, said apparatus comprising: a transducer assembly including acoustic pulse transmitting means for producing a plurality of acoustic pulses and an array of acoustic receiving means; a support means positioned on the ocean-floor for locating said transducer assembly at a predetermined submarine level above the water bottom; and means for rotating said transducer assembly relative to said support means about a substantially vertical axis of rotation.

9. An apparatus as recited in claim 8, further comprising means in communication with said transmitting means and said receiving means for determining the position of the mooring line on the basis of the time intervals between the transmitting of the pulses by said transmitting means and the receiving of the pulses reflected from the mooring lines by said receiving means.

10. An apparatus as recited in claim 8, wherein said support means comprises a ballast member for positioning said support means on the water bottom.

11. An apparatus as recited in claim 10, wherein said support means further comprises a support member carrying said transducer assembly, said support member and ballast member being interconnected by substantially parallel tension legs, and a buoyancy means connected to said support member.

12. An apparatus as recited in claim 8, wherein said support means further comprises means for suspending said support means from a moored structure.

13. An apparatus as recited in claim 8, wherein said receiving means generates signals and wherein said apparatus further comprises means for transferring said signals generated by said receiving means to another electronic means.

* * * * *